(12) United States Patent
Raffestin

(10) Patent No.: US 6,313,618 B1
(45) Date of Patent: Nov. 6, 2001

(54) METHOD FOR CONTROLLING THE DISSIPATION OF AN ELECTRIC SIGNAL AND IMPLEMENTING DEVICE

(75) Inventor: Luc Raffestin, Valence (FR)

(73) Assignee: Crouzet Automatismes, Valence (FR)

( * ) Notice: Subject to any disclaimer, the term of this patent is extended or adjusted under 35 U.S.C. 154(b) by 0 days.

(21) Appl. No.: 09/622,590

(22) PCT Filed: Feb. 16, 1999

(86) PCT No.: PCT/FR99/00342

§ 371 Date: Aug. 21, 2000

§ 102(e) Date: Aug. 21, 2000

(87) PCT Pub. No.: WO99/42913

PCT Pub. Date: Aug. 26, 1999

(30) Foreign Application Priority Data

Feb. 20, 1998 (FR) .................................................. 98 02086

(51) Int. Cl.[7] ...................................................... G05F 1/455
(52) U.S. Cl. ................................................................ 323/322
(58) Field of Search .................................. 323/237, 241, 323/318, 320, 322

(56) References Cited

U.S. PATENT DOCUMENTS

| | | |
|---|---|---|
| 3,605,026 | 9/1971 | Bowden . |
| 4,282,422 | 8/1981 | Payne et al. . |
| 4,334,147 | 6/1982 | Payne . |
| 4,642,553 * | 2/1987 | Foch et al. ............................ 323/322 |
| 4,871,961 * | 10/1989 | Kersten et al. ....................... 323/267 |
| 5,216,352 * | 6/1993 | Studtmann et al. .................. 323/241 |
| 5,483,149 * | 1/1996 | Barrett ................................. 323/300 |
| 5,629,607 * | 5/1997 | Callahan et al. ..................... 323/237 |
| 5,796,245 * | 8/1998 | Beaulieu et al. ..................... 323/322 |
| 5,821,703 * | 10/1998 | Callahan et al. ..................... 315/317 |
| 5,852,357 * | 12/1998 | D'Souza ............................... 323/239 |
| 6,028,421 * | 2/2000 | Kersten et al. ...................... 323/322 |

FOREIGN PATENT DOCUMENTS

| | | |
|---|---|---|
| 90 13 999 | 2/1991 | (DE) . |
| 41 08 406 | 9/1992 | (DE) . |
| 42 14 882 | 1/1993 | (DE) . |
| 2 641 435 | 7/1990 | (FR) . |
| 2 237 942 | 5/1991 | (GB) . |

* cited by examiner

Primary Examiner—Adolf Deneke Berhane
(74) Attorney, Agent, or Firm—Oblon, Spivak, McClelland, Maier & Neustadt, P.C.

(57) ABSTRACT

In order to implement a method of graduating the dissipation of an alternating electrical power signal, provision is made to place the position (Reg3) of a period of the alternating signal in correspondence with the binary inverse (Reg4) of a digitized set-point parameter. It is shown that, in this way, the periods of dissipation are ideally distributed among the periods of non-dissipation. This has the principal effect of reducing the effects of blinking which are particularly undesirable when the rise time of the phenomenon to be controlled is short as regards the period of the alternating electrical signal.

12 Claims, 4 Drawing Sheets

| REG2 C2 C1 C0 | | | Bit | B2B1B0 100 50% | B2B1B0 010 25% | B2B1B0 110 75% | B2B1B0 101 62,5% | Cycles |
|---|---|---|---|---|---|---|---|---|
| 7 | 1 | 1 | 1 | B2 | 1 | 0 | 1 | 1 | 1 |
| 6 | 1 | 1 | 0 | B1→ | 0 | 1 | 1 | 0 | 2 |
| 5 | 1 | 0 | 1 | B2 | 1 | 0 | 1 | 1 | 3 |
| 4 | 1 | 0 | 0 | B0→ | 0 | 1 | 1 | 1 | 4 |
| 3 | 0 | 1 | 1 | B2 | 1 | 0 | 1 | 1 | 5 |
| 2 | 0 | 1 | 0 | B1 | 0 | 0 | 1 | 0 | 6 |
| 1 | 0 | 0 | 1 | B2 | 1 | 0 | 0 | 1 | 7 |
| 0 | 0 | 0 | 0 | D | 0 | 0 | 0 | 0 | 8 |
| 7 | 1 | 1 | 1 | B2 | 1 | 0 | 1 | 1 | 9 |
| 6 | 1 | 1 | 0 | B1 | 0 | 1 | 1 | 0 | 10 |
| 5 | 1 | 0 | 1 | B2 | 1 | 0 | 1 | 1 | 11 |
| 4 | 1 | 0 | 0 | B0 | 0 | 0 | 1 | 1 | 12 |
| 3 | 0 | 1 | 1 | B2 | 1 | 0 | 1 | 1 | 13 |
| 2 | 0 | 1 | 0 | B1 | 0 | 0 | 1 | 0 | 14 |
| 1 | 0 | 0 | 1 | B2 | 1 | 0 | 0 | 1 | 15 |
| 0 | 0 | 0 | 0 | D | 0 | 0 | 0 | 0 | 16 |

| REG2 C7 C6 C5 C4 C3 C2 C1 C0 | Bit | 50% 10000000 | 75% 11000000 | Cycles |
|---|---|---|---|---|
| 255 1 1 1 1 1 1 1 1 | B7 | 1 | 1 | 1 |
| 254 1 1 1 1 1 1 1 0 | B6 | 0 | 1 | 2 |
| 253 1 1 1 1 1 1 0 1 | B7 | 1 | 1 | 3 |
| 252 1 1 1 1 1 1 0 0 | B5 | 0 | 0 | 4 |
| 251 1 1 1 1 1 0 1 1 | B7 | 1 | 1 | 5 |
| 250 1 1 1 1 1 0 1 0 | B6 | 0 | 1 | 6 |
| 249 1 1 1 1 1 0 0 1 | B7 | 1 | 1 | 7 |
| 248 1 1 1 1 1 0 0 0 | B4 | 0 | 0 | 8 |
| 247 1 1 1 1 0 1 1 1 | B7 | 1 | 1 | 9 |
| 246 1 1 1 1 0 1 1 0 | B6 | 0 | 1 | 10 |
| 245 1 1 1 1 0 1 0 1 | B7 | 1 | 1 | 11 |
| 244 1 1 1 1 0 1 0 0 | B5 | 0 | 0 | 12 |
| 243 1 1 1 1 0 0 1 1 | B7 | 1 | 1 | 13 |
| 242 1 1 1 1 0 0 1 0 | B6 | 0 | 1 | 14 |
| 241 1 1 1 1 0 0 0 1 | B7 | 1 | 1 | 15 |
| 240 1 1 1 1 0 0 0 0 | B3 | 0 | 0 | 16 |

METHOD FOR CONTROLLING THE DISSIPATION OF AN ELECTRIC SIGNAL AND IMPLEMENTING DEVICE

BACKGROUND OF THE INVENTION

The subject of the present invention is a method of graduating the dissipation of an electrical signal and a device for implementing this method. It can be used more particularly in the field of electric heating, whether it is domestic or industrial heating which is involved. The method can be used, nevertheless, to control any type of actuator. It can be made use of, for example, to control a motor. The object of the invention is to get round the problems of blinking which result, in the case of reduced dissipation, from the dissipation stopping of dissipation alternation.

DISCUSSION OF THE BACKGROUND

Devices are known for varying dissipation by control of phase. These devices are used mainly to produce light dimmers. They also serve for the control of motors. Their principle is to trigger dissipation, in the course of each excursion of an alternating electrical power signal, with a phase delay determined with respect to the zero-crossing of the voltage of the electrical signal. The drawback exhibited by this type of regulation is that of causing switching at the instant when the voltage of the electrical signal is high. This has the consequence of re-injecting spurious harmonics onto the electricity grid. Another type of device which solves these problems has been conceived of. The method which is employed there is a method of supplying power in syncopated wave trains. In practice, the electrical signal is dissipated during entire excursions, then turned off during the following excursions. The ratio between the number of excursions when dissipation occurs and those when it is prevented leads to the gradation of the consumption.

Hence, for consumption at half of the rated consumption, it is easily seen that one double excursion in two is subject to dissipation. The problem becomes more acute when the ratio is other than a half. To simplify the explanation, devices are known which, working, for example, over about a hundred periods of the alternating electrical signal, provide for dissipation to occur during certain successive excursions corresponding in number, in percentage terms, to the gradation ratio sought. The other excursions of the signal do not give rise to dissipation. The problem exhibited by this type of control is imperceptible when the rise time, or the inertia, of the phenomenon, especially thermal inertia, is greater than one or two seconds. However, this problem makes itself felt if the inertia of the phenomenon is less than one second. This is the case, for example, of a soldering iron in which the rise time is less than 0.5 second. With such a gradation device, this soldering iron would be alternately hot then cold, but could never be warm as desired. The other problem which occurs is that of light switching which is perceptible to the eye. This is the case, for example, for hot plates made of vitreous ceramic and used in kitchens. More generally, in fields other than the thermal field, whenever the rise time is short, the inconvenient nature of blinking reappears.

With the aim, nevertheless, of using this technique which exhibits the advantage of starting the dissipation at the voltage zeros and of ceasing it at the current zeros (thus without re-injecting spurious phenomena onto the grid), it is known to use microprocessors which are capable of organizing the dissipation over several excursions distributed as regularly as possible over a sequence of periods. These embodiments nevertheless exhibit the drawback that the microprocessors used are powerful (therefore expensive) and that, moreover, they are poorly adapted to the diversity of electrical standards: 60 hertz in America, 50 hertz in Europe.

SUMMARY OF THE INVENTION

The object of the invention is to remedy these problems by proposing a simple method which can be implemented by a small-scale, inexpensive microprocessor or even by a hard-wired circuit. Another advantage exhibited by the method of the invention is that of taking account very simply of the frequency of the electrical power supply. The principle of the invention consists, on the one hand, in comparing the binary representation of a set-point gradation parameter to be met with the position, expressed in binary form, of a period or of an excursion of the alternating electrical signal in a sequence of periods or of excursions. This position is attributed to a period or an excursion as a function of the place of this period or excursion in the history of a series of periods or excursions, which are predetermined in number. More precisely, the binary set point is placed in correspondence with the binary inverse of the position of the excursion. Moreover, these periods or excursions grouped into a sequence may, according to the invention, include a period or an excursion during which the dissipation is not performed. During this non-dissipation excursion, the frequency of the electrical signal is measured. Then it is imposed, in a temporally ballistic manner, that the cumulated duration of the following excursions of the sequence be an integer multiple of the duration of this measured excursion. On completion of the sequence of excursions, the duration of the period is measured again. The consequence of the method of the invention is to cause consumption which is systematically less than the possible rated consumption. The discrepancy is minimal, however. It corresponds, in a preferred example, to 0.25%.

Hence the subject of the invention is a method of graduating the dissipation of an alternating electrical signal into a load in which
  the dissipation is turned on at chosen moments of the electrical signal,
characterized in that
  a gradation set point is digitized in binary mode with a dynamic range of N bits, and a binary set point is obtained,
  excursions of the electrical signal are counted, or counted down, in binary mode with a cyclic N-bit counter, and a binary count representative of the position of the excursion is obtained,
  a first low-order significant bit of the binary count is placed in correspondence with a corresponding bit in the inverse of the binary set point, and
  dissipation is triggered when the inverse bit of the binary set point is significant.
  A further subject is a method of graduating the dissipation of an alternating electrical signal into a load, characterized in that
  dissipation is prevented during one excursion of a sequence of excursions of this alternating signal,
  the excursion duration is measured during this excursion in which the dissipation is prevented, and
  dissipation is turned on for a period equal to $2^N-1$ times the measured duration, on the other excursions of this sequence.
  A further subject is a device, characterized in that the dissipation is turned on by means of an electronic switch 21 and in that the measurement of the excursion duration is carried out at the terminals of the electronic switch.

BRIEF DESCRIPTION OF THE DRAWING

The invention will be better understood on reading the description which follows and on examining the figures which accompany it. These are given only by way of indication and are not in any way a limitation of the invention. The figures show.

DESCRIPTION OF THE PREFERRED EMBODIMENTS

Figure 1:
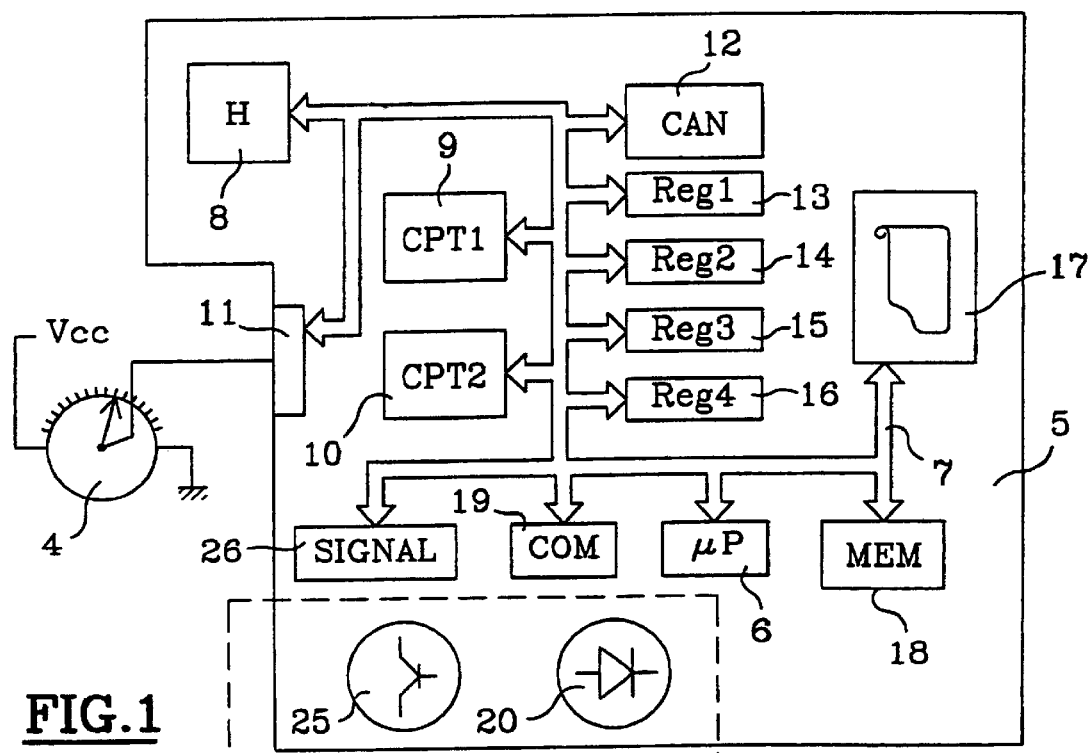
FIG. 1: the diagrammatic representation of a device which can be used to implement the method of the invention.

FIG. 1 shows a device which can be used to implement the method of the invention. An alternating electrical signal S1 is delivered by a source 1. It is intended to be dissipated into a load 2. In the case of heating, the load 2 is a resistance element 3. The gradation of the dissipation of the electrical signal is caused by a gradation set point produced by a graduator 4. For example, the graduator 4 is a potentiometer fed between Vcc and earth, the slider of which delivers a set point signal. The slider of this potentiometer is connected at the input of a microcontroller 5 which can be used to implement the method of the invention. The microcontroller 5 essentially includes a microprocessor 6 serving as an arithmetic and logic unit. The microprocessor 6 is linked, by means of a control, data and address bus 7 respectively with a clock 8, a first counter CPT1 9, a second counter CPT2 10, an input-output interface 11, an analogue-digital converter 12, a set of at least four registers 13 to 16, a non-volatile program memory 17, and a working memory 18 as required.

In order to control dissipation, in a preferred implementation of the invention, it has been chosen to use an optocoupler by way of a control relay. It will be seen later what supplementary advantage this use confers. The bus 7 is thus linked with a control register 19 which drives a set of light-emitting diodes 20 the light emitted by which is channelled onto a set 21 of triacs (mounted head-to-tail) with optical firing via their trigger. When the set 21 of triacs is conducting, the alternating electrical signal source 1 dissipates its energy into the load 2. When the set 21 is open-circuit, a measurement circuit 22, mounted in parallel with the set 21 of triacs, conducts a very low current into the load 2. The dissipation there is practically nil.

One advantage relating to the layout of the measurement circuit in parallel with the set 21 of triacs is that the control relay needs only two connection points linked to the source 1. It is not necessary, in order to take the measurement, to provide an additional connection point connected to the point of the source 1 which is not linked to the set 21 of triacs.

It is clearly understood that the set 21 of triacs is given only by way of example and that the dissipation can be controlled with any type of electronic switch, such as a thyristor or a power transistor, for example.

The weakness of this current is dictated by the high value of a resistor 23 placed in series with a set of light-emitting diodes 24 of the circuit 22. Under the influence of this current, the diodes 24 emit light. This is led via an optical coupling onto a phototransistor 25. The electric current passing into the phototransistor is detected, amplified, and its binary value is stored in a register 26 of the microcontroller 5. The phototransistor 25 is linked with an amplification circuit since the diodes 24 emit weakly when they are supplied with a voltage Si less than or equal to 48 volts. This weak emission is dictated by the high resistance 23, of about 200 kΩ. The high value of the resistance 23 is dictated by the concern not to consume too much power in it when the voltage S1 is of the order of 660 volts.

Various solutions can be envisaged for the control and measurement optocoupler 20–21 24–25. It can especially be produced in the form of an independent circuit 27 connected, on the one hand, to the microcontroller 5 and, on the other hand, in series between the source 1 and the load 2.

In the invention, in the second counter CPT2 10 which is an N-bit counter (in a preferred case N is equal to 8), the periods, or the excursions, which have occurred since an initial excursion or period are counted. The counter CPT2 10 is a cyclic counter which restarts counting when it has reached its nominal count of $2^N$. In a variant, the counter CPT2 10 can be made to count down. The counter CPT2 10 may be a hardware counter; it is preferably a software counter. There is a correspondence between the sequence of periods or excursions of the alternating electrical signal and the maximum at which the counter CPT2 10 may arrive. By counting one unit at each period, or each excursion, a position is attributed to each period or excursion in the sequence via the count from the counter. The binary count of the position of the period is stored in memory in a third register Reg3 15.

The analogue set-point signal available on the interface 11 is converted by the converter 12 into a binary set point, itself stored in a fourth register Reg4 16.

Figure 2:
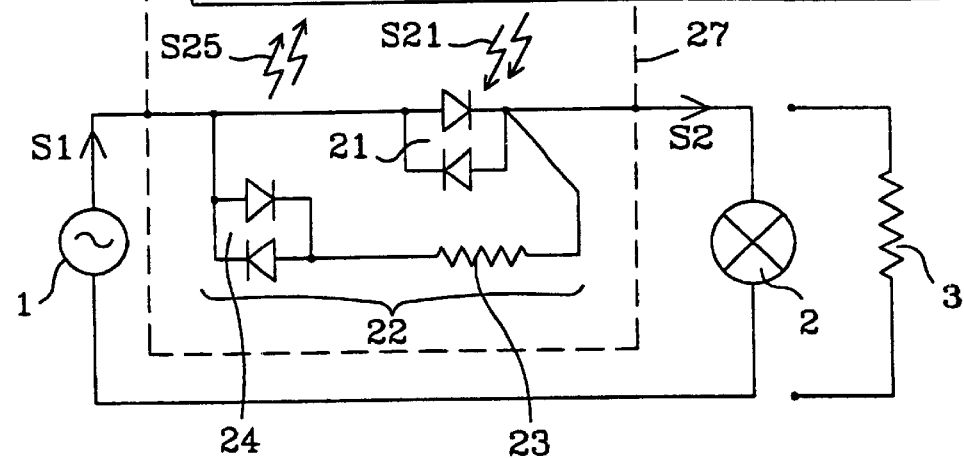
FIG. 2: the diagrammatic representation of the comparison of the binary set point with the inverse of the binary position of the excursion in the sequence.
Figure 2:
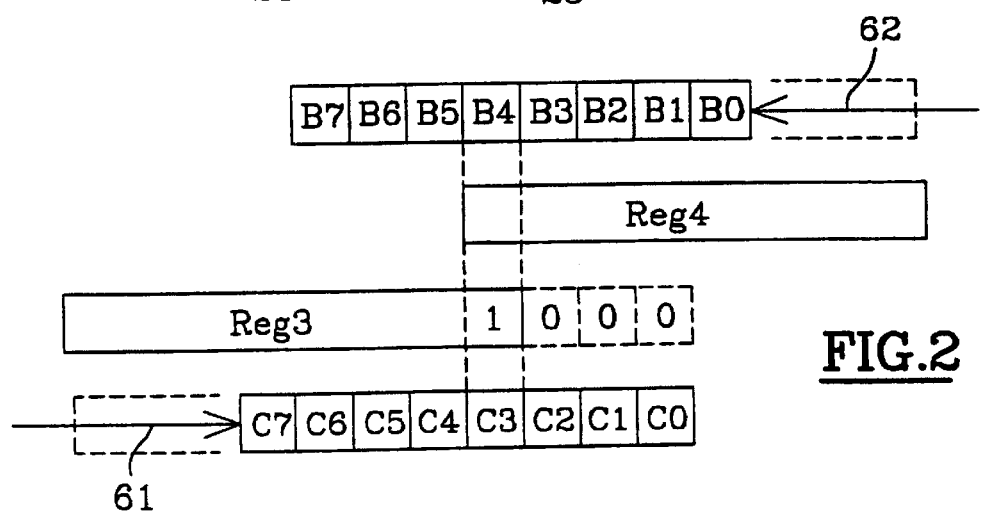

It is shown, in FIG. 2, that the binary set point also possesses N bits (N=8 in the preferred case), numbered B7 to B0, and is present in the register Reg4. Likewise, the binary count the bits of which are named C7 to C0 has been recorded in the register Reg3. The orders of the bits of the counter are denoted C7 to C0 going from high-order to low-order. The same goes for the bits B7 to B0.

In the invention, as shown briefly in FIG. 2, the binary count is compared with the inverse of the binary set point. The lowest-order significant bit (bit at 1) of the binary count is essentially placed in correspondence with the corresponding bit of the inverse of the binary set point.

At the outset, the correspondence is applied between the bit C0 and the bit B7. This correspondence is established only if the bit C0 is significant (at 1). The effects of this correspondence will be returned to later on.

Figures 3, 4A, 4B:
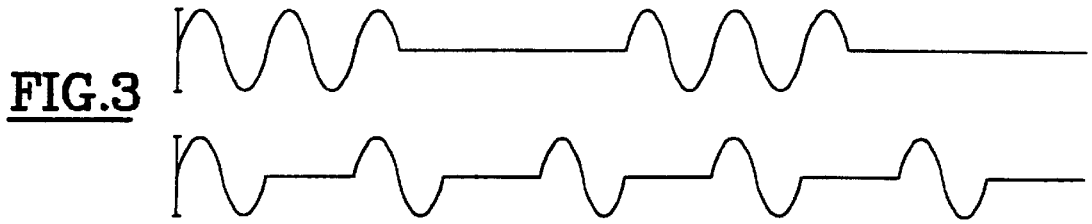
FIG. 3: a diagrammatic representation of the compared effects of the known gradation methods.
FIGS. 4a to 4b: tables representing the binary set point and the binary position, and showing how the regular distribution of the dissipation excursions is organized according to the invention.

FIG. 3 shows two distribution timing diagrams, in halves, of periods of dissipation and of non-dissipation. In the upper part, several periods of the alternating signal are followed by several periods of this signal during which there is no dissipation. In the lower part, periods of dissipation follow periods of non-dissipation. It is observed that the effects of blinking are less perceptible in the case of the lower part than in the case of the upper part because of the high frequency (on the scale of perception) of the electrical power supply signal.

FIGS. 4a and 4b show, on tables, the correspondences to be established between the binary count and the binary set point. FIG. 4a shows a simple variant in which N=3, FIG. 4b shows the variant in which N=8. The count of the counter CPT2 10 has been represented on FIG. 4a in a column 28. This count progresses in the sequence from one period, or from one excursion, to another. In an adjacent column 29 is shown the decimal value of the count of the counter 10. As this counter is cyclic, and since in the variant used it is a down-counter, its states pass from 7 to 0 then from 7 to 0 and so on. In binary, these states pass from 111 to 000, then from 111 to 000 and so on.

The value of the set point and its binary expression, respectively, have been depicted in the rows 30 and 31 of the table of FIG. 4a. This binary expression is given under the same number of bits as the binary count. The percentages represent a ratio as regards the rated value of the graduator. The position of the bit of the binary set point which is concerned with the lowest-order significant bit of the binary count has been depicted in a column 32. Hence, in a first row 33, the binary count is 111, the lowest-order significant bit which is equal to 1 is the bit C0. The lowest-order significant bit of the binary count gives information on the position of the bit of the binary set point to be taken into account. Here it relates to the bit of inverse order to the order of the bit C0: this is the highest-order bit: the bit B2. On the next row, the first significant bit C1 implies adopting bit B1 as bit of the set point.

On the fourth row, the binary count is 100. The lowest-order significant bit is the bit C2 which means adopting the bit B0. Depending on the indication present in the column 32 there is therefore displayed, in columns 34 to 37, the control values corresponding to the binary set points. Hence, in column 34, every time the bit B2 is designated, the value 1 is plotted. This is because the value of B2 is equal to 1. In contrast, every time B1 or B0 are designated, the value 0 is plotted in the column. Columns 34 to 37 then indicate the distributions of the periods of the alternating signal during which dissipation is turned on for other dissipation gradations. It is observed that the distribution of the dissipation and non-dissipation excursions is carried out ideally.

FIG. 4b repeats the same elements. However, in this figure, instead of describing a 3-bit counter CPT2, the counter described possesses 8 bits. In consequence, the set point will itself be derived over 8 bits, bits B0 to B7. The indications corresponding to columns 28 and 32 are applied to columns 38 and 39 of FIG. 4b. In a left-hand column 40 is depicted the decimal value of the position of the binary count. This position changes from 0 to 255 or, counting down, from 255 to 0.

The example represented in column 41 shows, for a gradation of 50%, that the only active set-point bit corresponding to the bits of the counter 10 is the bit B7. The other bits, B6, B5 B0 are zero. In column 42, for a gradation at 75%, a succession of 3 bits at 1, followed by a bit at 0 is obtained, as for the column 36.

As was explained previously, in the invention, a period, a double excursion, or possibly a single excursion is neutralized, during which the measurement of the duration of the period is made. This neutrality duration constitutes an error specific to the method of the invention. In the case in which the counter has 3 bits, the error is equal to $1/8$, that is to say to about 12.5%. This being so, even at the maximum dissipation, the load will be powered only 87.5% of the time. This non-negligible error should however be compared with the quantization error itself. The quantization error is equal to half the value of the lowest-order bit, i.e. 7.1% in all cases. Apart from the case of the rated value, the gradation error which can be blamed systematically on the method of the invention is only 5%. At nominal gradation, it is possible, moreover, to obtain the dissipation results expected by reducing the value of the load. With the preferred variant (with a 8-bit counter) of FIG. 4b, the error is reduced to $1/255$. This error is then negligible.

Figure 5:
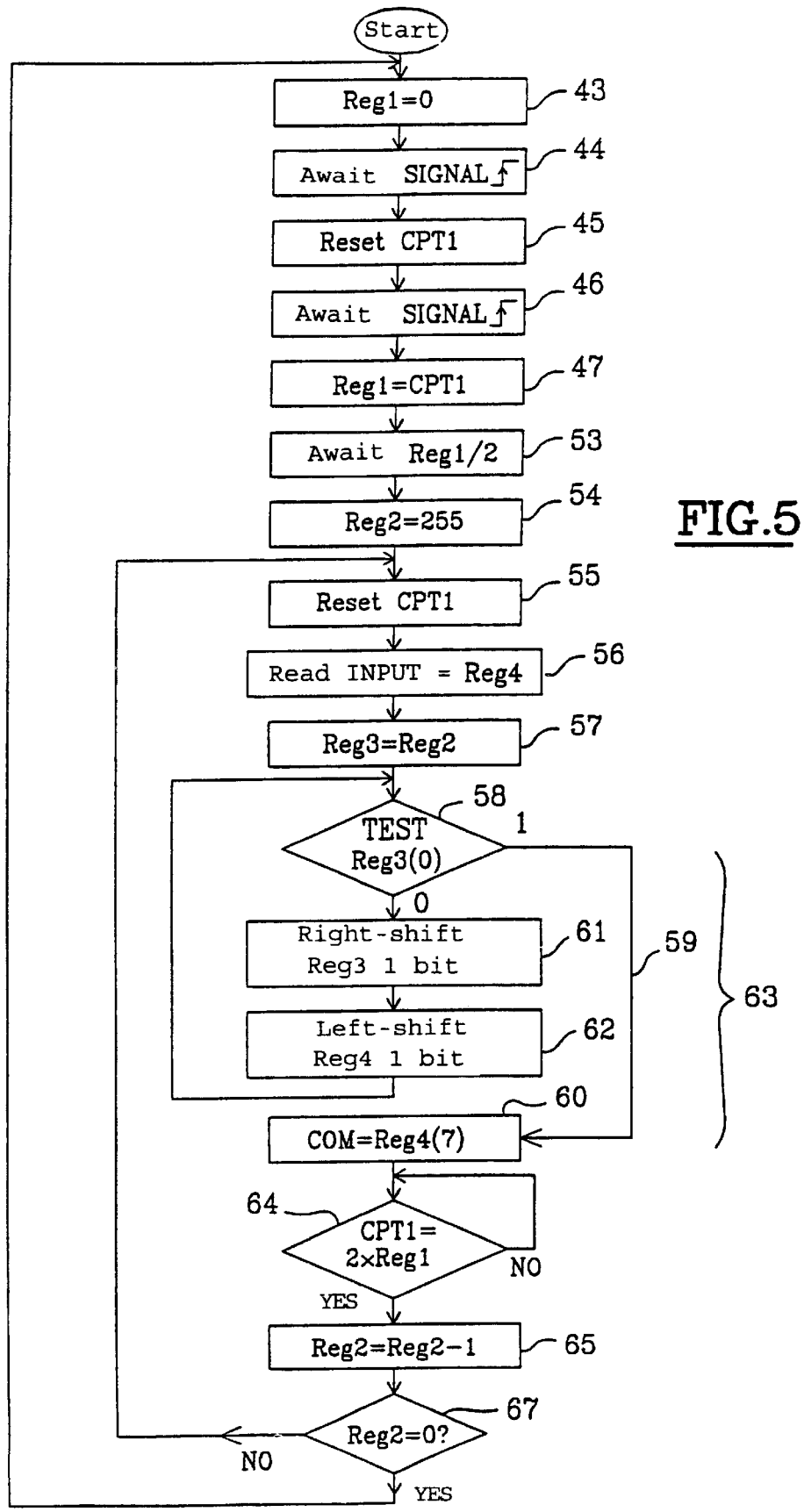
FIG. 5: an algorithm implemented by the circuit of FIG. 1 in order to apply the method of the invention.
Figure 6:
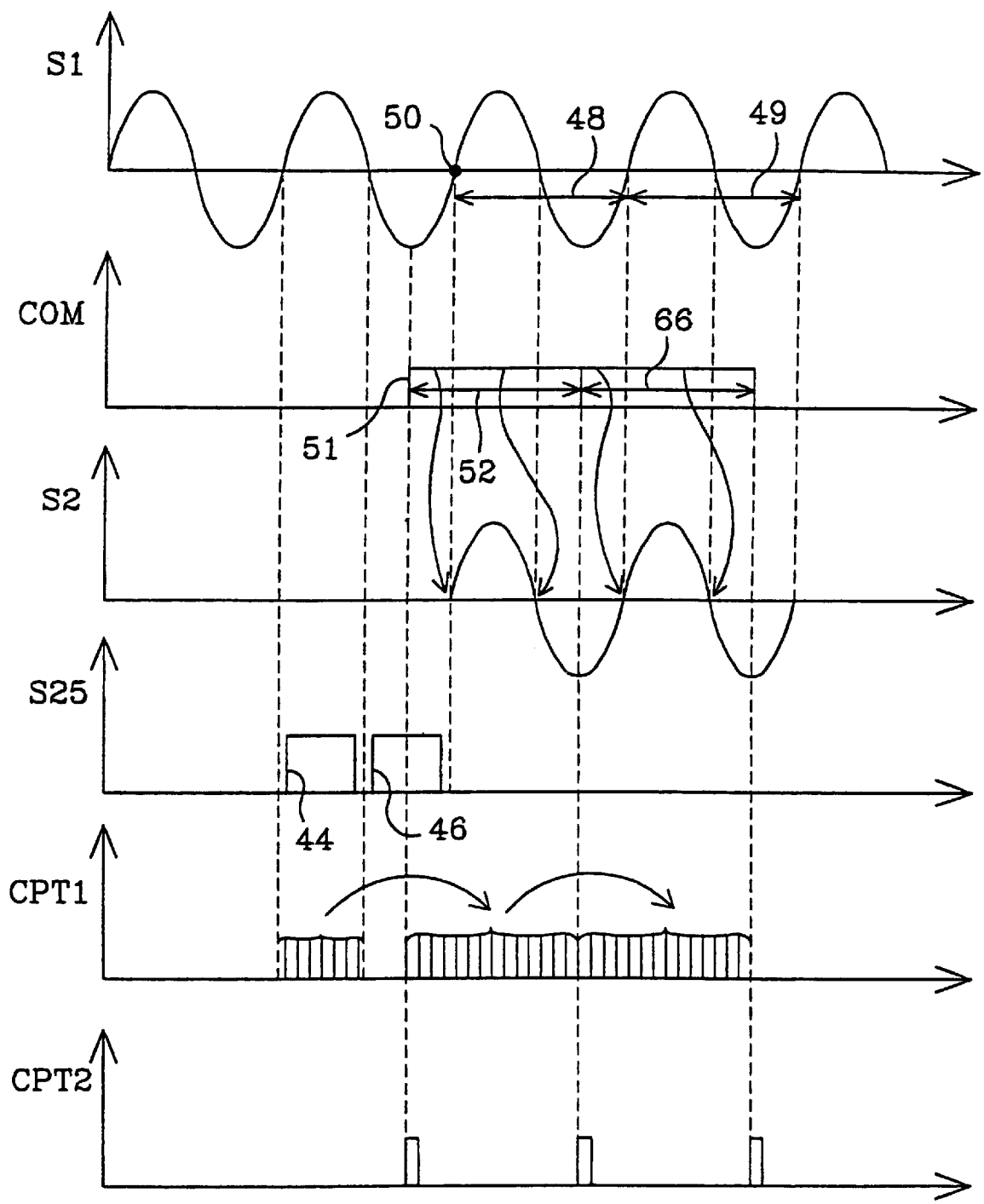
FIG. 6: timing diagrams of signals being produced in the circuit of FIG. 1 during application of the algorithm.

FIG. 5 shows the preferred stages of the method of the invention. The explanation of the operation of the method of the invention can be understood by also consulting FIG. 6. This represents timing diagrams corresponding respectively to the signal S1 delivered by the source 1, to the control signal COM available in the register 19, and to the dissipation signal S2 resulting, depending on the value of the set point, from the tables of FIG. 4a or 4b. FIG. 6 shows, below the signal S2, the signal S25 received by the phototransistor 25 and the counting signals CPT1 and CPT2 present in the counters 9 and 10. The counter 10 counts the periods of the signal S1. The program of FIG. 5 includes a description of the counter 10 in software form.

The program corresponding to the flowchart of FIG. 5 is stored in the memory 17 of the microcontroller 5. This program starts with a stage 43 in the course of which the register Reg1 13 is set to zero. The register Reg1 13 serves to store a value representative of the duration of the period of S1. The rising edge of the signal S25 is then awaited, in the course of a stage 44. The signal S25 conventionally exhibits a rising edge followed by a falling edge when the triac 21 are de-energized, are in open circuit, and when the current passes through the resistor 23. At the instant when the rising edge of S25 appears, the counter 9 is reset to zero at stage 45. The counting in the counter 9 is then undertaken and continues until, at a stage 46, another rising edge of the signal S25 is received. The counter CPT1 9 counts clock pulses. In one example, the clock produces signals with a frequency of the order of 15 kHz. The duration of the period of the clock 8 is about 64 microseconds. Because of the presence of the zero-crossings of S1 at each excursion, the counter 9, between two rising edges of S25, counts the clock beats which are produced during a half-period of the signal from the source 1. It counts for 10 milliseconds (in the case of 50 Hz), or a little over 8 milliseconds (in the case of 60 Hz). The value stored in the register Reg1 13 is therefore about 156 in the case of 50 Hz. It is lower for 60 Hz. This justifies the use of an 8-bit counter for the counter 9.

That done, the counting is stopped and the value of the counter 9 at that instant is stored in the register Reg1 13, at stage 47. The value stored in the register Reg1 13 is the value of a half-period, the value of one excursion. The detection of the two rising edges, designated symbolically by the references 44 and 46, is done by the firing of one or other of the two diodes of the set 24.

In the invention, "zero-crossing" optocouplers of known type are preferably used, which trigger the conduction of the triacs 21 only at the instant of zero-crossing of the voltage of S1. In that way, synchronization is obtained automatically. To trigger them, it is sufficient to produce a light signal S21 before the zero-crossing by the voltage, for example a quarter-period before as described below. It may then be justified to ratify the electrical dissipation, in advance, during the periods 48 and 49.

The signal S21, COM, may therefore be in advance of the 0-crossing, at the instant 50, by the electrical power supply signal S1. In fact, the triacs 21 should not be triggered until that moment. The advantage of acting in this way is of anticipating, from an instant 51 which occurs at three-quarters of the preceding period, the counting-down of a duration 52 corresponding to the working duration 48. In a following stage 53, it is therefore decided to wait for a duration equal to a quarter-period. This is achieved by waiting for a number of clock beats equal to half the content of Reg1 13. After the wait 53, corresponding to the arrival of the instant 51, in the course of a stage 54, the register Reg2 14 is set to the value 255 (or other value if N is other than 8). In this way, the algorithm of the method of the invention is initialized for 255 cycles. The register Reg2 14 is the current register of the count of the periods, the register Reg3 15 is a working register.

In the course of a following stage 55, the duration counter CPT1 9 is reset to zero. At the same time, counting is triggered. This can be seen in FIG. 6 at the CPT1 row from the instant 51. In the invention, at a stage 56 carried out very often, the value of the set point available on the input-output interface 11 is measured. The stage 56 is preferably carried out at each period of the signal S1. This measurement is converted by the converter 12 and the result is stored in the register Reg4 16. Ultimately, a binary plot corresponding to the ratio of the dissipation periods to the total duration of the 256 periods will be stored in this register Reg4 16.

At a following stage 57, the content of the register Reg2 (which is equal to 255 at the outset) is carried over to the auxiliary working register Reg3 15. The auxiliary register Reg3 15 will be made use of in order to seek the significant bits, of lowest order, of the position of the period under scrutiny. This search is carried out by a test 58 in the course of which it is seen whether the content of the 0-position bit of Reg3 is equal to 1. At the outset, cf. FIG. 2, the 0-position bit of the register Reg3 is equal to the bit C0. If this is the case, via a jump 59, it is stipulated, in the course of a stage 60, that the control register receive, as COM signal, the value of the high-order bit of the register Reg4 (which is storing the set-point value) At the outset, the corresponding high-order bit is bit B7 (in the variant in which N is equal to 8). If the bit of the register Reg3 tested is not equal to 1, in that case, with stages 61 and 62 respectively, the register Reg3 is right-shifted and the register Reg4 left-shifted. These stages are represented in FIG. 2.

That done, the preceding value C1 is carried over into the low-order bit of the register Reg3, at the same time as the value B6 is carried over into the high-order bit of the register Reg4. FIG. 2 shows a triple recurrence of stages 61 and 62 in the course of which it has been possible to measure that the first bit at 1 of the auxiliary register Reg3 which was equal to 1 was the bit C3. Under these conditions, at stage 60, the value B4 available in the high-order bit of the register Reg4 will be imposed as control signal COM. This control signal is equal to 1 or 0 depending on the value to which the bit B4 corresponds in the plots of FIGS. 4a, 4b. The triacs 21 should or should not be fired, as the case may be.

Given that these registers Reg3 and Reg4 have eight bits, stages 61 and 62 may have to be executed 8 times at most. With the test 58 and stage 60, there is thus a Bet 63 of 32 basic operations to be carried out. In one example, the fundamental frequency of the clock 8 is a frequency at 1 MHz giving a basic cycle time of the mircoprocessor of 1 microsecond. Consequently, the set 63 of stages 58 to 62 lasts 32 microseconds. This is much less than a quarter of the period which is equal to between 4 and 5 ms. The anticipation by a quarter-period (coupled with the use of a zero-crossing optocoupler) completely masks the problem of calculation speed of the mircoprocessor 6. That being so, the control signal COM should be applied with its value (0 or 1) over the duration 52. This is achieved by making the counter 9 count to a count equal to twice the content of the register 1. As long as this count is not reached, period 52 is still pending. This is achieved via a waiting stage 64.

When this period 52 terminates, at a stage 65, the counter consisting of the register Reg2 is made to count down. This register will be holding the value 254 (and so on down to zero). It would also be possible, as represented in FIG. 6, to count the pulses which correspond to the re-arming of the counter 1 by means of a hardware counter 10. As it had started from 255, on conclusion of stage 65, the content of the register Reg2 is not zero. Consequently, after a test 67, a second control period 66 will be embarked on, consecutive to the period 52. For this period 66, the same cycle of operations 55 to 65 is performed. In summary, these operations 55 to 65 are reproduced 255 times. A control signal COM will be taken to 1 or 0, as the case may be, on the basis of the state of the relevant bit of the register Reg4.

At the $256^{th}$ stage, the test 67 reveals that the content of the register Reg2 is zero. It holds eight zeros. In this case, the stages 43 to 54 are reiterated, in the course of which the duration of the half-period of the signal S1 from the source 1 is again measured, and stored in the register 1. At a frequency of 50 Hz, this amounts to measuring this period about every 5 seconds. In the preferred version of the invention, at this $256^{th}$ th stage, the triacs 21 are not fired, which leads to a reliable measurement of the duration of the period.

The entire operation has been explained by invoking the successive periods of the electrical signal. In this case, the control signal COM is held throughout the corresponding anticipation periods 52 or 68. It could be envisaged, however, applying the control alternately by distinguishing the positive excursions from the negative excursions. Likewise, the invention remains applicable if the electrical power signal is a pulsed signal, between zero and one, and in which there would only be positive excursions.

It has emerged that the fact of measuring the frequency of the signal S1 was a truly effective solution for avoiding the consequences of the drift in the power supply frequency and the drifts in operation of the microcontroller 5. In fact, because, in the invention, the excursions or periods are controlled separately as required, it is necessary to have exact synchronization. Since, during the conduction of the triacs, the voltage available at the terminals of these triacs is too low to be detected by the detection circuit, this problem has been solved by neutralizing one period and by taking the measurement of the duration of this period every $2^N$ periods. Subsequently, it is considered that, during the 255 following periods, this period does not change. To some extent, a ballistic determination is made of the end of the $255^{th}$ period.

The analogue-digital converter 12, for its part, samples and digitizes the set point over 8 bits in a much shorter time than that at the end of which the value is required to be stored in the register reg4, that is to say before the instant 51.

What is claimed is:

1. Method of graduating the dissipation of an alternating electrical signal into a load in which the dissipation is turned on (A) at chosen moments of the electrical signal, characterized in that a gradation set point is digitized in binary mode with a dynamic raise of N bits, and a binary set point is obtained, excursions of the electrical signal are counted (CP), or counted down, in binary mode with a cyclic N-bit counter, and a binary count representative of the position of the excursion is obtained, a low-order significant bit of the binary count is placed in correspondence with a corresponding bit in the inverse of the binary set point, and dissipation is triggered when the bit of the set point is significant.

2. Method according to claim 1, characterized in that the set point is digitized at each double excursion of the electrical signal.

3. Method according to claim 1, characterized in that, during one excursion out of $2_N$ excursions the electrical signal is not dissipated into the load.

4. Method of graduating the dissipation of an alternating electrical signal into a load, characterized in that dissipation is prevented during one excursion of a sequence of excursions of this alternating signal, the excursion duration is measured during this excursion in which the dissipation is prevented, and dissipation is turned on for a period equal to $2^N-1$ times the measured duration, on other excursions of this sequence.

5. Device for implementing the method according to claim 4, characterized in that the dissipation is turned on by means of an electronic switch and in that the measurement of the excursion duration is carried out at the terminals of the electronic switch.

6. Method according to claim 3, characterized in that the zero-crossing of this electrical signal is measured during an excursion where there is no dissipation, and the dissipation of the electrical signal is synchronized to a zero-crossing of this electrical signal.

7. Method according to claim 1, characterized in that the double excursions are taken into account instead of single excursions.

8. Method according to claim 1, characterized in that a load of lower impedance is chosen in order to dissipate the same electrical-signal power as with a nominal load.

9. Method according to claim 1, characterized in that an electric motor is powered according to this method.

10. Method according to claim 1 in which the number N is equal to 8.

11. Method according to claim 1, characterized in that the dissipation is turned on by triacs linked to an optocoupler.

12. Method according to claim 1, characterized in that the dissipation is ratified during one excursion via a signal present by anticipation during a preceding excursion.

* * * * *